Nov. 14, 1939.　　　R. S. HOPKINS　　　2,180,007
PHOTOGRAPHIC COPYING AND PROJECTION APPARATUS
Filed May 18, 1938
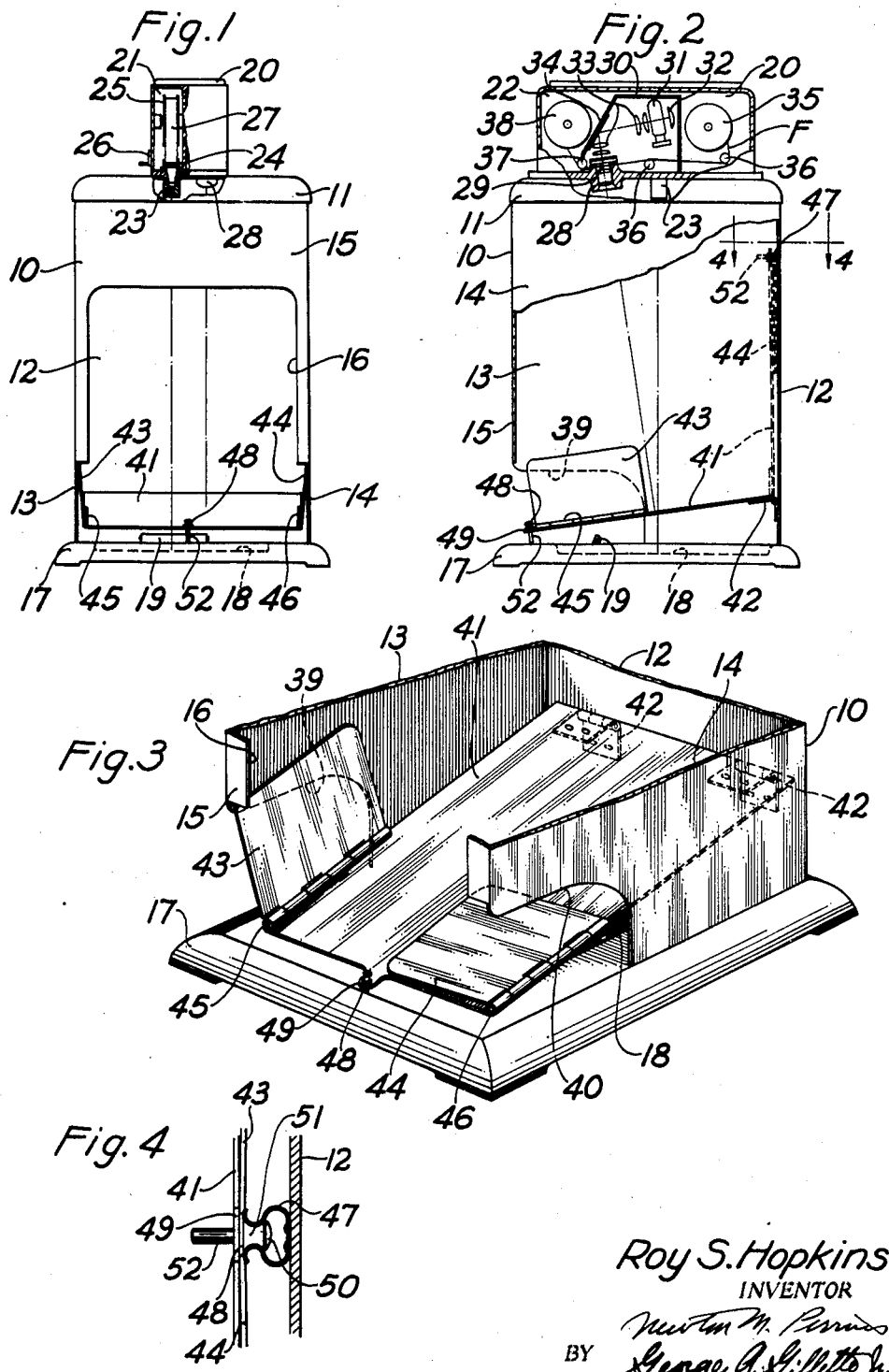
Roy S. Hopkins
INVENTOR
BY
ATTORNEYS Patented Nov. 14, 1939

2,180,007

UNITED STATES PATENT OFFICE 2,180,007

PHOTOGRAPHIC COPYING AND PROJECTION APPARATUS

Roy S. Hopkins, Rochester, N. Y., assignor to Eastman Kodak Company, Rochester, N. Y., a corporation of New Jersey Application May 18, 1938, Serial No. 208,606

7 Claims. (Cl. 88—24)

The present invention relates to a photographic copying and projection apparatus and more particularly to such an apparatus in which a screen member is movable from an inclined viewing position overlying the copy holder into an inoperative position rendering the copy holder available to a copying camera.

The primary object of the invention is the provision of a photographic copying and projection apparatus including a copy holder and a copying camera with its axis perpendicular thereto and including a screen member inclined in a convenient reading position and onto which an image may be projected by the projection apparatus, the document supporting surface of the copy holder being at an angle to the inclined position of the screen member.

Another object of the invention is the provision in the casing for a photographic copying apparatus of an opening adjacent the copy holder and facilitating the introduction or removal of documents into or from the casing and the document supporting surface therein.

A further object of the invention is the provision of a cover member for covering the aforesaid opening in the casing and which cover member is preferably connected to the screen member and capable of covering said opening only when the screen member is in operative position.

Still another object of the invention is the provision of a catch means for holding the screen member in inoperative position but which also functions as a handle to facilitate movement of the screen member and as a support for supporting the screen member when it is in operative position.

Other and further objects of the invention will be apparent to those skilled in the art from the following description.

The above and other objects are accomplished by a photographic copying and projection apparatus which comprises a casing provided with an open front, a copy holder for receiving a document to be copied, a copying camera on said casing with its axis perpendicular to the copy holder, a screen member movable into an inclined operative position within the casing and at an angle to the surface of said copy holder and a projector having its axis inclined away from the open front of the casing and perpendicular to said screen member when the same is in said operative inclined position. At least one side wall of the casing may be provided with an opening to facilitate the introduction and removal of documents with respect to the copy holder and in order to further darken the inside of the casing during projection, cover members are provided to cover such openings in the side walls. These cover members may be conveniently mounted upon the screen member so that they are movable into covering position only when the screen member is in operative position. Finally, catch means may also be provided for holding the screen member in its operative position and a stud of said catch means may perform the triple function of acting as part of the catch, a handle for moving the screen member and a support for the screen member when it is in operative position.

Reference is made to the accompanying drawing wherein similar reference characters designate similar elements and wherein:

Fig. 1 is a front elevation of the photographic copying and projection apparatus with a portion of the projector-camera housing broken away to illustrate the camera parts.

Fig. 2 is a side elevation of the photographic copying and projection apparatus with a portion of the casing broken away to illustrate details of the screen member and with a portion of the projector-camera housing broken away to illustrate the details of the projector.

Fig. 3 is a fragmentary perspective of the copy holder and screen member showing one cover member in covering position and the other member in folded position.

Fig. 4 is a fragmentary section taken on the line 4—4 of Fig. 2 and illustrating details of the catch means.

Although the photographic copying and projection apparatus is illustrated as of the upright type with the copy holder in a horizontal plane, it is to be understood that the features of the invention may be employed in other types of photographic copying and projection apparatus. Neither are the features of the cover members on the screen limited to an apparatus in which the axes of the camera and projector are at an angle.

In the illustrated embodiment of the invention, the apparatus casing 10 comprises a top wall 11, a rear wall 12, side walls 13 and 14, and a front wall 15 which is provided with an opening 16. The copy holder 17 preferably forms the base of the open front casing 10 and has a document receiving area or supporting surface which may be provided as a document well 18 in said copy holder 17. A guide member 19 may be provided in said document well 18 for a purpose fully explained in my copending application Serial No. 208,605 entitled "Photographic copying apparatus" and filed on even date herewith.

The projector-camera housing 20 has a camera compartment 21 and a projector compartment 22. The copying camera is of conventional construction and includes a camera objective 23, a film gate 24, a film spooling system 25 and a film advancing means not shown, but operative by the crank 26 to move the light-sensitive film 27 through the film gate 24 within the focal plane of the objective 23. The axis of the copying camera is indicated by the dash dot lines in Figs. 1 and 2, said axis being perpendicular to the copy holder 17 and being centered with respect to the document well 18.

The projector is also of conventional design and may comprise a projector objective 28, a film gate 29 and a lamp housing 30 containing a light source 31, a reflector 32, a condenser system 33, and a mirror 34, all for directing and concentrating the light from light source 31 into the film gate 29. The image bearing film F extends from a supply reel 35, over guide rolls 36, through film gate 29 and over another guide roll 37 to the take-up reel 38. The axis of the projector is inclined at an angle away from the open front of the casing 10 for a purpose to be later explained.

When the photographic copying and projection apparatus of the invention is being used for copying, the operator must frequently insert his hands into the casing, either for the purpose of inserting or removing a document, of turning the pages of a book, or turning a check from one stack to another. If the casing 10 has only an open front such operations are rendered awkward and inconvenient. Accordingly, at least one of the side walls and preferably both side walls 13 and 14 are provided, respectively, with openings 39 and 40. Said openings 39 and 40 are provided in the lower front corner of the side walls 13 and 14 and extend from the open front of casing 10 along a portion of copy holder 17.

It is preferred to supply a separate screen member in a photographic copying and projection apparatus, not only to provide a better projection surface which will not be deteriorated by placing documents thereon but also because such a screen member may be positioned at an inclination or angle which renders observation of the projected image through the open front of the apparatus more convenient. According to the invention, a screen member 41, having any suitable reflecting or diffusing surface for receiving a light-projected image, is operatively connected within the casing 10 for movement to an operative inclined position, shown in Figs. 1, 2 and 3, inclusive, and for movement to an inoperative position indicated by the dotted lines in Fig. 2. Said screen member 41 may be hinged to the rear wall 12 of casing 10 by a pair of hinges 42.

It will be understood that during projection, the image on screen member 41 may be affected by the light entering through the openings 39 and 40 in side walls 13 and 14. Consequently, the light projected image may be improved by providing cover members which may be moved to cover said openings 39 and 40. Such cover members are operatively connected to the casing 10 and are preferably provided as cover flaps 43 and 44, hinged respectively, at 45 and 46 to the side edges of screen member 41 and for covering the respective openings 39 and 40. When the screen member 41 is moved to its operative inclined position, said cover flaps 43 and 44 may be located to cover the openings 39 and 40 and to intercept the light through said openings 39 and 40. Alternatively, when the apparatus is to be used for copying, said cover flaps 43 and 44 may be folded to an inoperative position, see cover flap 44 in Fig. 3, then the screen member 41 may be swung to its inoperative position with the flaps 43 and 44 lying against the rear wall 12 of casing 10, see the dotted position thereof illustrated in Fig. 2.

A catch means is provided for holding the screen member 41 in said inoperative position. Such a catch means may comprise a fastener or spring clip 47 mounted on rear wall 12 and a stud 48 mounted in a tab 49 extending from screen member 41. Said stud 48 has a head 50 provided with a peripheral groove 51 for engagement with the ends of spring clip 47, and has a stem 52 serving as a handle for moving the screen member 41 forwardly, dis-engaging spring clip 47 and stud head 50, and for supporting the forward end of screen member 41 at a predetermined distance from copy holder 17 so that the angle of screen member 41 will be that which is most convenient for observation by the operator through the open front of casing 10.

The angle of inclination of the projector axis is determined by the aforementioned most convenient or suitable inclination for the screen member 41 because for best results the axis of the projector should be perpendicular to the screen member 41 when it is in its inclined operative position. Therefore, it is preferred to provide the axis of the copying camera and of the projector at an angle to each other although such inclination of these axes is not a limitation upon the arrangement of the cover members on the screen member 41 or of the openings 39 and 40 provided in the side walls 13 and 14 of the casing. Those skilled in the art will recognize many variations of the present invention which are not illustrated or described herein but which are within the scope of the appended claims.

Having now particularly described my invention, what I desire to secure by Letters Patent of the United States and what I claim is:

1. A photographic copying and projection apparatus, comprising a casing provided with an open front, a copy holder within said casing and having a document receiving area in a plane which is conveniently located for the introduction and removal of documents to be copied, a copying camera mounted on said casing and having an axis which is perpendicular to the document receiving area of said copy holder, a screen member movable within said casing into an operative inclined position which is at an angle to the document receiving area of said copy holder and movable into an inoperative position to render said copy holder available to said copying camera, and a projector also mounted on said casing and having an axis perpendicular to said screen member when the same is in said operative inclined position.

2. A photographic copying and projection apparatus, comprising a casing provided with an open front, including top and side walls and a base member for supporting a document to be copied, a copying camera mounted on said top wall and having a vertical axis which is perpendicular to said base member, a projector also mounted on said top wall with its axis inclined away from the open front of said casing, and a screen member movable within said casing into an operative inclined position which is convenient for reading through said open front and which is perpendicular to the axis of said projector and movable into an inoperative position to render said base member available to said copying camera.

3. A photographic copying and projection apparatus, comprising a casing provided with an open front and including a pair of side walls, a copy holder having a document supporting surface, a copying camera mounted on said casing and for photographically copying a document upon said copy holder, at least one of said side walls of the casing being provided with an opening adjacent said copy holder and for facilitating introduction and removal of a document with respect to said copy holder, a projector on said casing and for projecting an image onto a screen surface within said casing, and a cover member operatively connected to said casing, movable to close the opening in said side wall, and for further adapting said casing for use with said projector.

4. A photographic copying and projection apparatus, comprising a casing provided with an open front and including a pair of side walls, a copy holder having a document supporting surface, a copying camera mounted on said casing and for photographically copying a document upon said copy holder, at least one of said side walls of the casing being provided with an opening adjacent said copy holder and for facilitating introduction and removal of a document with respect to said copy holder, a screen member movable into an operative position within said casing, a projector on said casing for projecting an image onto said screen member, and a cover member operatively connected to said screen member and movable therewith into a position to cover the opening in said side wall.

5. A photographic copying and projection apparatus, comprising a casing provided with an open front and including a pair of side walls, a copy holder having a document supporting surface, a copying camera mounted on said casing and for photographically copying a document upon said copy holder, at least one of said side walls of the casing being provided with an opening adjacent said copy holder and for facilitating introduction and removal of a document with respect to said copy holder, a screen member operatively connected to said casing and movable into operative and inoperative positions therein, a projector on said casing for projecting an image onto said screen member when the same is in said operative position, and a cover member operatively connected to said screen member and movable into a position to cover the opening in said side wall only when said screen member is in said operative position.

6. A photographic copying and projection apparatus, comprising an upright casing provided with an open front and including a rear wall and a pair of side walls, a copy holder forming the base for said casing and having a document supporting area, a copying camera mounted on said casing and for photographically copying a document upon said copy holder, at least one of said side walls of the casing being provided with an opening extending from the open front and along a portion of said copy holder, a screen member hinged to the rear wall of said casing, movable into an operative position overlying said copy holder and movable into an inoperative position to render said copy holder available to said camera, a projector on said casing for projecting an image onto said screen member, and a cover flap hinged to the side edge of said screen member, movable into an operative position to cover the opening in said side wall when said screen member is in said operative position and foldable into a compact relation to said screen member when the same is moved to said inoperative position.

7. A photographic copying and projection apparatus, comprising an upright casing provided with an open front and having a rear wall and a pair of side walls, a copy holder forming the base for said casing and having a document supporting area, a screen member operatively connected to one of the walls of said casing and movable into operative and inoperative positions therein, and a catch means for said screen member including a fastener on a wall of said casing and a stud on said screen member for engaging said fastener to hold the screen member in said inoperative position, said stud providing a handle to facilitate disengagement thereof from said fastener, and serving as a support when the screen member is in said operative position.

ROY S. HOPKINS.